US012679141B2

(12) United States Patent
Hans et al.

(10) Patent No.: US 12,679,141 B2
(45) Date of Patent: Jul. 14, 2026

(54) RUBBER COMPOSITION AND TIRE

(71) Applicant: The Goodyear Tire & Rubber Company, Akron, OH (US)

(72) Inventors: Michael Hans, Trier (DE); Eric Engeldinger, Redange-sur-Attert (LU); Christian Jean-Marie Kaes, Schrondweiler (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 639 days.

(21) Appl. No.: 17/813,784

(22) Filed: Jul. 20, 2022

(65) Prior Publication Data

US 2023/0109062 A1 Apr. 6, 2023

Related U.S. Application Data

(60) Provisional application No. 63/250,310, filed on Sep. 30, 2021.

(51) Int. Cl.

*B60C 1/00* (2006.01)
*C08L 9/06* (2006.01)
*C08L 83/08* (2006.01)

(52) U.S. Cl.

CPC .................. *B60C 1/00* (2013.01); *C08L 9/06* (2013.01); *C08L 83/08* (2013.01)

(58) Field of Classification Search

CPC . B60C 1/00; C08L 15/00; C08L 91/00; C08L 91/06; C08L 47/00; C08L 9/06; C08L 83/08; C08K 5/09; C08K 3/36; C08K 5/548; C08K 3/22; C08K 3/06; C08K 5/3437; C08K 5/47; C08K 5/40; C08K 3/04; C08K 5/103

See application file for complete search history.

(56) References Cited

U.S. PATENT DOCUMENTS

| | | | |
|---|---|---|---|
| 6,653,387 B2 | 11/2003 | Causa et al. | |
| 8,490,666 B2 | 7/2013 | Margot et al. | |
| 2005/0056967 A1* | 3/2005 | Villani | B29C 37/0067 264/496 |
| 2012/0123018 A1 | 5/2012 | Kanz et al. | |
| 2017/0240731 A1 | 8/2017 | Yamashiro et al. | |
| 2019/0092098 A1* | 3/2019 | Blok | B60C 1/0016 |
| 2022/0119626 A1 | 4/2022 | Kitago et al. | |

FOREIGN PATENT DOCUMENTS

| | | |
|---|---|---|
| CN | 102558631 A | 7/2012 |
| EP | 0829511 A1 | 3/1998 |
| JP | 2015110704 A | 6/2015 |

OTHER PUBLICATIONS

Machine translation of JP2015110704A obtained from the European Patent Office website in Jan. 2025 (Year: 2015).*

Extended European Search Report for Application No. 22198188.9, dated Feb. 3, 2023.

Chinese Office Action for Application No. 202211206507.3, dated Jun. 30, 2025.

Search Report for Application No. 202211206507.3, dated Jun. 30, 2025.

* cited by examiner

*Primary Examiner* — Kregg T Brooks
*Assistant Examiner* — Devin Mitchell Darling
(74) *Attorney, Agent, or Firm* — Mandy B. Willis

(57) ABSTRACT

The present invention is directed to a rubber composition comprising 10 phr to 100 phr of at least one partially saturated elastomer comprising repeat units, wherein at most 15% of all repeat units of the elastomer comprise a double bond; 0 phr to 90 phr of at least one diene based elastomer; 40 phr to 200 phr of at least one filler; and at least 5 phr of aluminum hydroxide.

18 Claims, No Drawings

RUBBER COMPOSITION AND TIRE

FIELD OF THE INVENTION

This invention relates to a rubber composition, in particular for a tire or one of its rubber components. Moreover, the present invention is directed to a tire or a rubber component of a tire comprising such a rubber composition.

BACKGROUND OF THE INVENTION

In view of a continuing demand for improved tire performance, new material combinations are constantly being evaluated and tested by tire manufacturers. In particular, in many tire tread rubber compositions, it is difficult to overcome the hysteresis/tear tradeoff. While it may be possible to obtain good tensile and/or tear properties and maintain rolling resistance indicators at a high level in some approaches, it is often found difficult to obtain at the same time acceptable wet performance. Moreover, there are often drawbacks in wet performance when trying to improve one or more of the above mentioned properties. There is thus a continuous need to provide new rubber compositions for tires which provide good wet, tear and rolling resistance properties. Preferably, abrasion resistance should also be maintained at a reasonable level.

SUMMARY OF THE INVENTION

A first object of the present invention may be to provide a rubber composition having desirable rolling resistance and/or hysteresis properties.

Another object of the present invention may be to provide a rubber composition having good tensile properties and/or advanced durability and wear resistance.

Another object of the present invention may be to provide a rubber composition with desirable wet performance indicators.

Yet another object of the present invention may be to provide a rubber composition exhibiting a good compromise of hysteresis properties, tensile properties and wet performance.

The present invention is defined by claim 1. Further preferred embodiments are mentioned in the appended dependent claims and in the summary herein below.

Thus, in a first aspect of the invention, the present invention is directed to a sulfur vulcanizable rubber composition comprising 10 phr to 100 phr (preferably 50 phr to 100 phr) of at least one partially saturated (or in other words unsaturated) elastomer comprising repeat units, wherein at most 15% of all repeat units of the elastomer comprise a double bond. Furthermore, the rubber composition comprises 0 phr to 90 phr (preferably 0 phr to 50 phr) of at least one diene based elastomer; 40 phr to 200 phr of at least one filler; and at least 5 phr of aluminum hydroxide, and optionally at most 100 phr of the aluminum hydroxide.

In particular, it has been discovered by the inventors that the combination of such an only partially saturated styrene butadiene rubber (such as a solution polymerized styrene butadiene rubber) and the provision of aluminum hydroxide can significantly improve the balance between rolling resistance and wet performance. At the same time, tear/tensile properties are kept on an advanced level.

In another embodiment, at most 15%, preferably at most 10%, or even more preferably at most 8%, of all repeat units have a double bond. Alternatively or in addition, at least 2%, and preferably at least 4%, of the repeat units have a double bond. In particular, it may be less desirable that the elastomer is fully free of double bonds or completely hydrogenated. In particular, some of the double bonds (typically originating from a double bond of a monomer unit) shall remain in place for the purpose of cross linking. When counting double bonds in this application, the bonds in an aromatic structure or group, such as of a styrene repeat unit, are not counted as double bond. However, a styrene unit is still counted as a repeat unit for the determination of the total number of repeat units in the polymer or elastomer.

In still another embodiment, said filler comprises one or more of:

i) from 35 phr to 190 phr of silica (e.g. from 35 phr to 95 phr of silica, or from 75 phr to 190 phr of silica);
ii) predominantly silica;
iii) silica with a BET surface area within a range of 150 $m^2/g$ to 250 $m^2/g$ (preferably from 200 $m^2/g$ to 250 $m^2/g$); and
v) less than 10 phr carbon black (preferably at most 5 phr carbon black).

In another embodiment, the aluminum hydroxide has one or more of:

i) a D50 particle diameter within a range of 0.2 μm and 35 μm (preferably 20 μm, or more preferably 5 μm), and
ii) a BET surface area within a range of 1 $m^2/g$ to 20 $m^2/g$.

The aluminum hydroxide particle diameters are determined with a Zetasizer™ Nano S from Malvern using dynamic light scattering based on ISO 22412 or equivalent. The BET surface area of aluminum hydroxide particles is determined in accordance with ISO 9277 or equivalent.

In another embodiment, the rubber composition comprises from 30 phr (optionally from 38 phr or from 45 phr) to 80 phr of aluminum hydroxide. In particular, it has been found out by the inventors that these rather high loadings of aluminum hydroxide are desirable in combination with the partially saturated polymer according to the invention, without resulting in unacceptable tear or tensile properties. Also treadwear is maintained at an advanced level despite relatively high lading of aluminum hydroxide.

In still another embodiment, the partially saturated elastomer comprises repeat units formed by (or consisting of) residues of monomers selected from ethylene, propylene, butadiene, isoprene, and styrene. These monomers are preferably used to make or obtain the partially saturated elastomer. One or more of the residues may be hydrogenated. In other words, double bonds of one or more of the residues may be hydrogenated.

In yet another embodiment, the partially saturated elastomer is a hydrogenated styrene butadiene rubber, preferably a hydrogenated solution-polymerized styrene butadiene rubber (SSBR). Hydrogenated SSBR and its manufacturing as such is known to the person skilled in the art and is for instance described in U.S. Patent Application Publications 2018201065 A1, 2018251576 A1 and 20190062539 A1.

In still another embodiment, the partially saturated elastomer is a hydrogenated styrene butadiene rubber, preferably a hydrogenated solution polymerized styrene butadiene rubber.

In still another embodiment, the rubber composition further comprises from 3 phr to 20 phr (preferably from 5 phr to 15 phr) of a polyoctenamer. Addition of polyoctenamer helps to further improve tensile properties and also the co-curability to other diene based elastomeric compounds. Moreover, as discovered by the inventors, the presence of the polyoctenamer helps to improve rolling resistance indicators in combination with the partially saturated elastomer such as a hydrogenated SSBR.

In another preferred embodiment, the polyoctenamer has one or more of: a glass transition temperature within a range of −50° C. to −80° C., determined under ASTM D3418 as mentioned hereinbelow; a weight average molecular weight Mw within a range of 80,000 g/mol to 100,000 g/mol, determined by gel permeation chromatography (GPC) using polystyrene calibration standards according to ASTM 5296-11 or equivalent; and a melting point within a range of 45° C. to 55° C., measured by DSC in second heating, according to ASTM D3418 or equivalent.

In yet another preferred embodiment, the polyoctenamer has between 65% and 85% of trans double bonds of all double bonds in the polyoctenamer.

In another embodiment, the rubber composition further comprises from 0.5 phr to 10 phr of a rosin based resin, preferably from 1 phr to 9 phr, or even more preferably from 1 phr to 4 phr of the rosing based resin (e.g. a gum rosin or dimerized gum rosin). The inventors have found out that such small amounts of rosin based resin can significantly improve the wet performance of the rubber composition, also in combination with the aluminum hydroxide.

In still another embodiment, the rubber composition comprises from 60 phr to 100 phr of the partially saturated elastomer, and 0 phr to 40 phr of one or more of polybutadiene and polyisoprene.

In yet another embodiment, the rubber composition comprises from 75 phr to 95 phr of the partially saturated elastomer and from 5 phr to 25 phr of the polybutadiene, wherein the polybutadiene has a glass transition temperature within a range of −90° C. to −115° C.

In an alternative embodiment, the rubber composition comprises from 75 phr to 95 phr of the partially saturated elastomer and from 5 phr to 20 phr of the polyisoprene, preferably chosen from one or more of natural rubber and synthetic polyisoprene.

In still another embodiment, the partially saturated elastomer has a glass transition temperature in a range of −20° C. to −60° C., preferably in a range of −20° C. to −45° C., or even more preferably in a range of −25° C. to −40° C.

In still another embodiment, the partially saturated elastomer is a styrene butadiene rubber (such as a partially saturated solution-polymerized styrene butadiene rubber), having one or more of:

i) less than 5% of non-hydrogenated vinyl groups, based on the total number of vinyl groups of the hydrogenated styrene butadiene rubber;

ii) less than 20%, preferably less than 10%, or even more preferably less than 5%, of non-hydrogenated double bonds in cis-1,4 and trans-1,4 butadiene repeat units, based on the total number of cis-1,4 and trans-1,4 butadiene repeat units;

iii) from 80%, preferably from 85% or from 90%, to 99% of hydrogenated double bonds;

iv) a bound styrene content ranging from 5% to 40%, preferably from 20% to 35%, and a butadiene content ranging from 50% to 95%, or from 50% to 80%, by weight;

v) a glass transition temperature within a range of −20° C. to −60° C.; and vi) a molecular weight Mw within a range of 200,000 g/mol to 500,000 g/mol.

In another preferred embodiment, the hydrogenated styrene butadiene rubber has from 90% to 98% of hydrogenated double bonds. In other words, there are still double bonds remaining which have not been hydrogenated. As known to the person skilled in the art, the number of double bonds can be determined by NMR. This applies also to partially saturated elastomers which are not styrene butadiene rubbers.

In yet another embodiment, the bound styrene content of the styrene-butadiene rubber will be within the range of 10% to 40% and its bound butadiene content will be within the range of 60% to 90%, by weight, as determined by NMR. The styrene-butadiene rubber will typically have a bound styrene content which is within the range of 20% to 35% and a bound butadiene content which is within the range of 65% to 75%.

In another embodiment, the rubber composition comprises from 5 phr to 70 phr (preferably from 15 phr to 45 phr) of at least one plasticizer chosen from one or more of at least one oil and at least one resin. In one embodiment, it is preferred for processing reasons to add either oil or resin. In another embodiment, the rubber composition comprises oil and resin as plasticizers.

In yet another embodiment, the rubber composition comprises between 0 phr and 30 phr of oil, or from 5 phr to 30 phr of oil, or preferably from 10 phr to 25 phr of oil.

In still another embodiment, the oil has a glass transition temperature within a range of −45° C. to −85° C. The glass transition temperature of an oil is determined as a peak midpoint by a differential scanning calorimeter (DSC) at a temperature rate of increase of 10° C. per minute, according to ASTM E1356 or equivalent.

In one embodiment, the rubber composition further comprises a hydrocarbon traction resin (or resin) selected from one or more of DCPD resins, CPD resins, terpene resins, C5 resins, C9 resins, coumarone indene resin, styrene-alphamethylstyrene or combinations of those. Preferably such a resin is added in a range of 15 phr to 50 phr.

In another embodiment, a glass transition temperature of the resin is within a range of 30° C. to 80° C., preferably 40° C. to 80° C., or even more preferably within a range of 40° C. to 70° C. A glass transition temperature of a resin is determined herein as a peak midpoint by a differential scanning calorimeter (DSC) at a temperature rate of increase of 10° C. per minute, according to ASTM D6604 or equivalent.

In another embodiment, the resin has a softening point of at least 95° C. determined according to ASTM E28, or equivalent, which might sometimes be referred to as a ring and ball softening point. Preferably, the softening point is at most 140° C. or more preferably at most 120° C., or even more preferably at most 110° C.

In still another embodiment, the resin has a polydispersity index within a range of 1 to 5, preferably of 1 to 2, or even more preferably of 1.5 to 1.8.

In yet another embodiment, the resin has a weight average molecular weight Mw within a range of 150 g/mol to 1500 g/mol, preferably 400 g/mol to 1000 g/mol, or more preferably 500 g/mol to 900 g/mol, or even more preferably 600 g/mol to less than 700 g/mol. The resin Mw is determined with gel permeation chromatography (GPC) using polystyrene calibration standards according to ASTM 5296-11 or equivalent.

In another embodiment, said resin is one or more of a hydrogenated resin, and a C9/aromatically modified resin.

In an embodiment, the hydrogenated resin is a hydrogenated hydrocarbon resin which is optionally selected from fully or partially hydrogenated C9 resins, fully or partially hydrogenated C5 resins, fully or partially hydrogenated alpha methyl styrene resins, fully or partially hydrogenated terpene resins, fully or partially hydrogenated rosin resins, or mixtures thereof. It is also possible that the resin is modified by one or more aliphatic or aromatic groups.

In another embodiment, the hydrogenated hydrocarbon resin is a fully or partially hydrogenated cyclopentadiene resin, fully or partially hydrogenated dicyclopentadiene, or a combination thereof.

In still another embodiment, the hydrogenated hydrocarbon resin is free of double bonds. Such a highly hydrogenated hydrocarbon resin is even more compatible with the rubber matrix according to the present invention.

In an embodiment, the hydrogenated hydrocarbon resin comprises multiple, preferably different, monomer residues, wherein the majority of said monomer residues are aliphatic residues, and wherein said aliphatic residues are free of double bonds. In an embodiment, the remaining monomer residues could be aromatic or comprise aromatic groups. In particular, such groups could be present if the resin is modified with aromatic groups. Preferably, aliphatic monomers could comprise C5 monomers, cyclopentadiene monomers, dicyclopentadiene monomers. Hydrogenation can render the monomer residues of such aliphatic monomers double bond free. Aromatic monomers could for instance comprise C9 monomers.

In still another embodiment, the rubber composition comprises at least 3 phr of at least one mercapto silane, preferably a blocked mercapto silane, such as 3-(octanoylthio)-1-propyltriethoxysilane. Preferably, such a silane is present within a range of 3 phr to 20 phr.

In yet another embodiment, the rubber composition comprises 0.3 phr to 3 phr of a vulcanization accelerator selected from one or more of dithiocarbamate accelerators and thiuram accelerators. Such accelerators are known to be fast accelerators and are herein considered as particularly beneficial in view of the utilization of the limited amounts of double bonds in the elastomer, and optionally also in the resin.

In still another embodiment, said vulcanization accelerator is tetrabenzylthiuramdisulfide which has turned out to be a preferred choice in combination with the present type of elastomer.

In an embodiment, the rubber composition may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers. In some embodiments, the partially saturated elastomer may also be a diene-based polymer.

In another embodiment, an emulsion polymerization derived styrene/butadiene (ESBR) might be used having a styrene content of 20 to 35 percent bound styrene or, for some applications, an ESBR having a medium to relatively high bound styrene content, namely a bound styrene content of 30 to 45 percent. By emulsion polymerization prepared ESBR, it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared SBR (SSBR) may be used. Such an SSBR may for instance have a bound styrene content in a range of 5 to 50, preferably 9 to 36, percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator.

In one embodiment, a synthetic or natural polyisoprene rubber may be used. Synthetic cis 1,4-polyisoprene and cis 1,4-polyisoprene natural rubber are as such well known to those having skill in the rubber art. In particular, the cis 1,4-content may be at least 90%, optionally at least 95%.

In one embodiment, cis 1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis 1,4-content ("high cis" content) and a glass transition temperature Tg in a range of from −95° C. to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646.

A glass transition temperature, or Tg, of an elastomer or elastomer composition, where referred to herein, represents the glass transition temperature(s) of the respective elastomer or elastomer composition in its uncured state or possibly a cured state in the case of an elastomer composition. A Tg is determined as a peak midpoint by a differential scanning calorimeter (DSC) at a temperature rate of increase of 10° C. per minute, according to ASTM D3418.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr, of one or more additional diene-based rubbers, such as SBR, SSBR, ESBR, PBD/BR, NR and/or synthetic polyisoprene. In another example, the composition may include less than 5, preferably less than 3, phr of an additional diene-based rubber or be also essentially free of such an additional diene-based rubber. The terms "compound" and "composition" may be used herein interchangeably, unless indicated otherwise. The terms "rubber" and "elastomer" are also used herein interchangeably, unless indicated otherwise.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

In an embodiment, the rubber composition includes silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area as measured using nitrogen gas. In one embodiment, the BET surface area may be in the range of 40 to 600 square meters per gram. In another embodiment, the BET surface area may be in a range of 80 to 300 square meters per gram. The BET method of measuring surface area is described in the Journal of the American Chemical Society, Volume 60, Page 304 (1930). The conventional silica may also be characterized by having a dibutylphthalate (DBP) absorption value in a range of 100 to 400, alternatively 150 to 300. A conventional silica might be expected to have an average ultimate particle size, for example, in the range of 0.01 to 0.05 micron as determined by the electron microscope, although the silica particles may be even smaller, or possibly larger, in size. Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc.; and silicas available from Evonik AG with, for example, designations VN2 and Ultrasil 6000GR, 9100GR, etc.

In an embodiment, the rubber composition includes also carbon black as one of the filler materials. Preferred amounts in this application range from 1 phr to 60 phr, preferably from 1 phr to 10 phr or from 1 phr to 5 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 g/kg to 145 g/kg and a DBP number ranging from 34 $cm^3$/100 g to 150 $cm^3$/100 g.

In another embodiment, other fillers may be used in the rubber composition including, but not limited to, particulate fillers including ultra-high molecular weight polyethylene (UHMWPE), crosslinked particulate polymer gels including but not limited to those disclosed in U.S. Pat. Nos. 6,242,534, 6,207,757, 6,133,364, 6,372,857, 5,395,891 or 6,127,488, and a plasticized starch composite filler including but not limited to that disclosed in U.S. Pat. No. 5,672,639. Such other fillers may be used in an amount ranging from 1 phr to 10 phr.

In one embodiment, the rubber composition may contain a conventional sulfur containing organosilicon compounds or silanes. Examples of suitable sulfur containing organosilicon compounds are of the formula:

$$\text{Z-Alk-S}_n\text{-Alk-Z} \quad \text{I}$$

in which Z is selected from the group consisting of

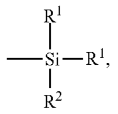,
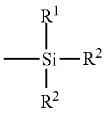
and
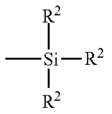

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

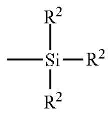

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials. In another embodiment, suitable sulfur containing organosilicon compounds include those disclosed in U.S. Patent Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders, and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e. primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature which is within the range of 140° C. to 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of a tire (or in other words tire components). For example, the rubber component may be a tread (including tread cap and tread base), sidewall, apex, chafer, sidewall insert, wirecoat or innerliner. However, tread rubber applications are the preferred applications for the present invention.

In a second aspect of the invention, the invention is directed to a tire comprising the rubber composition according to the first aspect, optionally in accordance with one or more of its embodiments.

In one embodiment, the tire has a tread cap comprising the rubber composition. Thus, the rubber composition is intended to contact the ground or the road when driving.

The tire may be an uncured tire or cured tire, i.e. a vulcanized tire.

In one embodiment, the tire has a radially outer tread cap layer, intended to come into contact with the road when driving, comprising the rubber composition.

In another embodiment, the tire has a radially outer tread cap layer and a radially inner tread cap layer, wherein the radially inner tread cap layer comprises the rubber composition.

The tire of the present invention may for example be a pneumatic tire or nonpneumatic tire, a race tire, a passenger tire, an aircraft tire, an agricultural tire, an earthmover tire, an off-the-road (OTR) tire, a truck tire or a motorcycle tire. The tire may also be a radial or bias tire.

Vulcanization of the pneumatic tire of the present invention may for instance be carried out at conventional temperatures which is within the range of 100° C. to 200° C. In one embodiment, the vulcanization is conducted at temperatures which are within the range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Multiple features of the aspects and embodiments mentioned herein may be combined with one another.

DETAILED DESCRIPTION OF EMBODIMENTS OF THE INVENTION

Below Table 1 shows multiple rubber compositions including a partially saturated elastomer in the form of a hydrogenated solution-polymerized styrene butadiene rubber. Examples 1, 3, 4, 5 which are not in accordance with the present invention are based on a SSBR and natural rubber polymer matrix. Example 2 (also not in accordance with the present invention) comprises 100 phr of a hydrogenated SSBR. The Inventive Examples 1, 2, 3 are also based on a 100 phr hydrogenated SSBR rubber matrix. According to embodiments of the present invention, all Inventive Examples include aluminum hydroxide in relatively high amounts. For comparison, Examples 3, 4 and 5 comprise the same amounts of aluminum hydroxide as the respective Inventive Examples 1, 2, and 3. The total oil amounts are at 16 phr in each composition. Different oils are utilized to adjust the rubber composition Tg to the same or similar level for a better comparison of the different rubber compositions under review. Some rubber compositions with higher aluminum hydroxide load comprise less silica than rubber compositions with lower aluminum hydroxide load, in particular preferably in order to keep a balanced filler to polymer ratio. The rubber compositions comprising the hydrogenated SSBR have an additional fast accelerator in the form of tetrabenzylthiuram disulfide in view of the limited amount of available double bonds for the sulfur cure.

TABLE 1

| | Sample (amounts in phr) | | | | | | | |
|---|---|---|---|---|---|---|---|---|
| Ingredient | Ex. 1 | Ex. 2 | Ex. 3 | Inv. Ex. 1 | Ex. 4 | Inv. Ex. 2 | Ex. 5 | Inv Ex. 3 |
| Hydrogenated SSBR[1] | 0 | 100 | 0 | 100 | 0 | 100 | 0 | 100 |
| SSBR[2] | 80 | 0 | 80 | 0 | 80 | 0 | 80 | 0 |
| Polyisoprene[3] | 20 | 0 | 20 | 0 | 20 | 0 | 20 | 0 |
| $Al(OH)_3$[4] | 0 | 0 | 20 | 20 | 40 | 40 | 60 | 60 |
| Oil 1[5] | 0 | 5 | 0 | 5 | 0 | 5 | 0 | 5 |
| Oil 2[6] | 16 | 11 | 16 | 11 | 16 | 11 | 16 | 11 |
| Stearic Acid | 2 | 2 | 2 | 2 | 2 | 2 | 2 | 2 |
| Silica[7] | 80 | 80 | 80 | 80 | 60 | 60 | 40 | 40 |
| Silane[8] | 8 | 8 | 8 | 8 | 6 | 6 | 4 | 4 |
| Zinc Oxide | 3 | 3 | 3 | 3 | 3 | 3 | 3 | 3 |
| Sulfur | 1.5 | 1.5 | 1.5 | 1.5 | 1.5 | 1.5 | 1.5 | 1.5 |
| Waxes | 2 | 2 | 2 | 2 | 2 | 2 | 2 | 2 |
| Antidegradants[9] | 4.5 | 4.5 | 4.5 | 4.5 | 4.5 | 4.5 | 4.5 | 4.5 |
| Accelerator[10] | 2.2 | 2.2 | 2.2 | 2.2 | 2.2 | 2.2 | 2.2 | 2.2 |
| TBzTD[11] | 0 | 0.5 | 0 | 0.5 | 0 | 0.5 | 0 | 0.5 |
| Carbon Black | 3 | 3 | 3 | 3 | 3 | 3 | 3 | 3 |

[1]hydrogenated solution-polymerized styrene butadiene rubber having a glass transition temperature of about −30° C.
[2]as SLR4602 from Trinseo with a glass transition temperature of about −27° C.
[3]natural rubber
[4]aluminum hydroxide having a BET surface area of 15 $m^2$/g and d50 of 0.4 μm, d95 of 0.8 μm and d10 of 0.3 μm
[5]sunflower oil
[6]TDAE oil
[7]HDS Silica having a BET surface area of 215 $m^2$/g
[8]3-(octanoylthio)-1-propyltriethoxysilane as NXT ™ from Momentive
[9]dihydroquinolines and phenylene diamines
[10]N-Tert-Butyl-2-benzothiazolesulfenamide
[11]tetrabenzylthiuram disulfide Table 2 provides further Examples not in accordance with the invention (i.e. Examples 6 to 10) and further Inventive Examples 4 to 6. In contrast to the rubber compositions shown in Table 1, Examples 6 to 10 are based on a polymer matrix comprising the same SSBR but a low-Tg polybutadiene. Moreover, a traction resin is used instead of oil in all compositions listed in Table 2.

TABLE 2

| | Sample (amounts in phr) | | | | | | | |
|---|---|---|---|---|---|---|---|---|
| Ingredient | Ex. 6 | Ex. 7 | Ex. 8 | Inv. Ex. 4 | Ex. 9 | Inv. Ex. 5 | Ex. 10 | Inv Ex. 6 |
| Hydrogenated SSBR[1] | 0 | 100 | 0 | 100 | 0 | 100 | 0 | 100 |
| SSBR[2] | 80 | 0 | 80 | 0 | 80 | 0 | 80 | 0 |
| Polybutadiene[12] | 20 | 0 | 20 | 0 | 20 | 0 | 20 | 0 |
| $Al(OH)_3$[4] | 0 | 0 | 20 | 20 | 40 | 40 | 60 | 60 |
| Resin[13] | 16 | 11 | 16 | 11 | 16 | 11 | 16 | 11 |
| Stearic Acid | 2 | 2 | 2 | 2 | 2 | 2 | 2 | 2 |
| Silica[7] | 80 | 80 | 80 | 80 | 60 | 60 | 40 | 40 |
| Silane[8] | 8 | 8 | 8 | 8 | 6 | 6 | 4 | 4 |
| Zinc Oxide | 3 | 3 | 3 | 3 | 3 | 3 | 3 | 3 |

TABLE 2-continued

| | Sample (amounts in phr) | | | | | | | |
|---|---|---|---|---|---|---|---|---|
| Ingredient | Ex. 6 | Ex. 7 | Ex. 8 | Inv. Ex. 4 | Ex. 9 | Inv. Ex. 5 | Ex. 10 | Inv Ex. 6 |
| Sulfur | 1.5 | 1.5 | 1.5 | 1.5 | 1.5 | 1.5 | 1.5 | 1.5 |
| Waxes | 2 | 2 | 2 | 2 | 2 | 2 | 2 | 2 |
| Antidegradants[9] | 4.5 | 4.5 | 4.5 | 4.5 | 4.5 | 4.5 | 4.5 | 4.5 |
| Accelerator[10] | 2.2 | 2.2 | 2.2 | 2.2 | 2.2 | 2.2 | 2.2 | 2.2 |
| TBzTD[11] | 0 | 0.5 | 0 | 0.5 | 0 | 0.5 | 0 | 0.5 |
| Carbon Black | 3 | 3 | 3 | 3 | 3 | 3 | 3 | 3 |

[12]high cis-1,4 polybutadiene having a Tg of −110° C.
[13]alpha pinene terpene based resin having a Tg of 70° C. as Dercolyte™ A115 from DRT Measurements of physical properties/tire tests have been carried out for the compositions listed in Tables 1 and 2 and are shown in below Tables 3 and 4, respectively.

TABLE 3

| | Sample (values in %) | | | | | | | |
|---|---|---|---|---|---|---|---|---|
| Test/Property* | Ex. 1 | Ex. 2 | Ex. 3 | Inv. Ex. 1 | Ex. 4 | Inv. Ex. 2 | Ex. 5 | Inv Ex. 3 |
| Rolling resistance | 100 | 102 | 99.0 | 101 | 103 | 103 | 100 | 104 |
| Wet traction | 100 | 90 | 103 | 95 | 102 | 102 | 109 | 104 |
| Tensile strength | 100 | 154 | 94 | 136 | 86 | 143 | 94 | 138 |
| Treadwear | 100 | 106 | 84 | 90 | 46 | 78 | 50 | 78 |

*For determination of rolling resistance, rolling resistance indicator tangent delta has been determined at 30° C. by means of dynamic mechanical analysis (DMA) and results have been normalized with respect to Example 1 at 100% rolling resistance, wherein higher values are better; for the determination of wet traction, a transmittable friction force was determined with a linear friction tester and the results have been normalized with respect to Example 1 at 100% wet traction, wherein higher values are better; for the determination of tensile strength, true tensile strength was determined according to ASTM D412 with a ring sample and the results have been normalized with respect to Example 1 at 100% tensile strength, wherein higher values are better; for the determination of treadwear, abrasion has been determined according to ASTM D5963 and the results have been normalized with respect to Example 1 at 100% treadwear, wherein higher values are better.

As shown by the test results of Table 3, rolling resistance has been improved in Examples 2, 4 and Inventive Examples 1, 2 and 3. However, Example 2 has a limited wet traction. In particular, wet traction has been improved over Example 1 in Examples 3, 4, 5 and Inventive Examples 2 and 3. With regards to tensile strength, improvements are visible for all compositions comprising the hydrogenated SSBR, whereas the other compositions lost tensile strength, apparently upon addition of aluminum hydroxide. Finally, treadwear is kept at an acceptable level for the Inventive Examples. Overall, the balance of the Inventive Examples is better than the balance of the Examples not in accordance with the invention, in particular when taking into account at least 3 of the above mentioned properties.

TABLE 4

| | Sample (values in %) | | | | | | | |
|---|---|---|---|---|---|---|---|---|
| Test/Property* | Ex. 6 | Ex. 7 | Ex. 8 | Inv. Ex. 4 | Ex. 9 | Inv. Ex. 5 | Ex. 10 | Inv Ex. 6 |
| Rolling resistance | 100 | 103 | 98 | 101 | 99 | 103 | 102 | 104 |
| Wet traction | 100 | 100 | 111 | 108 | 118 | 113 | 118 | 114 |
| Tensile strength | 100 | 142 | 94 | 117 | 95 | 126 | 90 | 122 |
| Treadwear | 100 | 106 | 89 | 93 | 68 | 84 | 74 | 75 |

*The determination of the properties was carried out as shown for Table 3 but the results have been normalized with respect to Example 6 in present Table 4.

With respect to the results shown in Table 4, Examples 7 to 9 and Inventive Examples 4 to 6 have been normalized to the respective results of Example 6. The use of the hydrogenated polymer in Example 7 has significantly improved the tensile strength in an order of 40%. The addition of aluminum hydroxide in Example 8 has impaired rolling resistance, tensile strength and treadwear, whereas wet traction has been significantly improved. Inventive Example 4 shows an advanced balance of the measured properties. Example 9 has particular weaknesses in treadwear and tensile strength. Example 10 loses even more tensile strength compared to Examples 6 and 9. Inventive Example 5 has very good rolling resistance, wet traction and tensile strength, with a slight tradeoff in treadwear. While Inventive Example 6 has the best rolling resistance and wet traction of the compounds measured in accordance with Table 4, and as well a good tensile strength, tread wear is at 75% of Example 6 but still higher than that of Examples 9 and 10.

Overall, also the results of Table 4 demonstrate that the embodiments of the invention can achieve an improved balance of the determined properties or performances.

While certain representative embodiments and details have been shown for the purpose of illustrating the subject invention, it will be apparent to those skilled in this art that various changes and modifications can be made therein without departing from the scope of the subject invention.

What is claimed is:

1. A sulfur vulcanizable rubber composition comprising:

80 phr to 95 phr of at least one partially saturated elastomer comprising repeat units, wherein at least 2% and at most 15% of all repeat units of the partially saturated elastomer comprise a double bond, wherein the at least one partially saturated elastomer is a diene-based elastomer;

5 phr to 20 phr of at least one polybutadiene having a glass transition temperature within a range of −90° C. to −115° C.;

40 phr to 200 phr of filler comprising silica and at least 30 phr of aluminum hydroxide.

2. The rubber composition according to claim 1 wherein at most 8% of the repeat units have a double bond.

3. The rubber composition according to claim 1 wherein at least 4% of the repeat units have a double bond.

4. The rubber composition according to claim 1 wherein said filler comprises one or more of: (i) from 35 phr to 190 phr of silica, (ii) silica and carbon black, wherein silica is the predominant filler material, (iii) silica with a BET surface area within a range of 150 $m^2/g$ to 250 $m^2/g$, and (iv) less than 10 phr carbon black.

5. The rubber composition according to claim 1 wherein the aluminum hydroxide has one or more of: (i) a D50 particle diameter within a range of 0.2 μm and 30 μm, and (ii) a BET surface area within a range of 1 $m^2/g$ to 20 $m^2/g$.

6. The rubber composition according to claim 1 comprising from 30 phr to 80 phr of the aluminum hydroxide.

7. The rubber composition according to claim 1 wherein the partially saturated elastomer comprises repeat units formed by residues of monomers selected from ethylene, propylene, butadiene, isoprene, and styrene.

8. The rubber composition according to claim 1 wherein the partially saturated elastomer is a hydrogenated styrene butadiene rubber.

9. The rubber composition according to claim 1 further comprising from 3 phr to 20 phr of a polyoctenamer.

10. The rubber composition according to claim 9 wherein the polyoctenamer has one or more of:

a glass transition temperature within a range of −50° C. to −80° C.;

a molecular weight Mw within a range of 80,000 to 100,000 g/mol, determined by GPC;

a melting point within a range of 45° C. to 55° C., measured by DSC in a second heating; and between 65% and 85% of trans double bonds.

11. The rubber composition according to claim 10 wherein the rubber composition comprises from 80 phr to 95 phr of the partially saturated elastomer and from 5 phr to 20 phr of polyisoprene.

12. The rubber composition according to claim 1, wherein the partially saturated elastomer has one or more of:

a glass transition temperature within a range of −20° C. to −60° C.; and a molecular weight Mw within a range of 200,000 g/mol to 500,000 g/mol.

13. The rubber composition according to claim 1, wherein the partially saturated elastomer is a solution-polymerized styrene butadiene rubber having one or more of:

(i) less than 5% of nonhydrogenated vinyl groups, based on the total number of vinyl groups of the hydrogenated styrene butadiene rubber;

(ii) less than 20% of nonhydrogenated double bonds in cis-1,4 and trans-1,4 butadiene repeat units, based on the total number of cis-1,4 and trans-1,4 butadiene repeat units;

(iii) from 80% to 99% of hydrogenated double bonds;

(iv) a bound styrene content ranging from 5% to 40% and a butadiene content ranging from 50% to 95%, by weight; and (v) a molecular weight Mw within a range of 200,000 g/mol to 500,000 g/mol.

14. The rubber composition according to claim 1 wherein the rubber composition comprises:

from 5 phr to 50 phr of at least one plasticizer chosen from one or more of at least one oil and at least one resin.

15. The rubber composition according to claim 1 wherein the rubber composition comprises at least 3 phr of at least one mercapto silane.

16. The rubber composition according to claim 1 wherein the rubber composition further comprises a resin selected from one or more of DCPD resins, CPD resins, terpene resins, C5 resins, C9 resins, coumarone indene resin, styrene-alphamethylstyrene or combinations of those.

17. The rubber composition according to claim 1 further comprising 0.3 phr to 3 phr of a vulcanization accelerator selected from one or more of dithiocarbamate accelerators and thiuram accelerators.

18. A tire comprising the rubber composition of claim 1.

* * * * *